US012625235B2

(12) United States Patent
Jaanson et al.

(10) Patent No.: US 12,625,235 B2
(45) Date of Patent: May 12, 2026

(54) MULTISPECTRAL LiDAR COMPRISING A SPECTRAL DELAY UNIT

(71) Applicant: IRIDESENSE, Issy-les-Moulineux (FR)

(72) Inventors: Priit Jaanson, Paris (FR); Albert Manninen, Paris (FR)

(73) Assignee: IRIDESENSE, Issy-les-Moulineux (FR)

( * ) Notice: Subject to any disclaimer, the term of this patent is extended or adjusted under 35 U.S.C. 154(b) by 964 days.

(21) Appl. No.: 17/794,903

(22) PCT Filed: Jan. 25, 2021

(86) PCT No.: PCT/EP2021/051639
§ 371 (c)(1),
(2) Date: Jul. 22, 2022

(87) PCT Pub. No.: WO2021/148679
PCT Pub. Date: Jul. 29, 2021

(65) Prior Publication Data
US 2023/0121746 A1     Apr. 20, 2023

Related U.S. Application Data

(60) Provisional application No. 62/965,751, filed on Jan. 24, 2020.

(51) Int. Cl.
*G01S 7/48*     (2006.01)
*G01S 7/481*     (2006.01)
*G01S 7/4865*     (2020.01)
*G01S 17/26*     (2020.01)

(52) U.S. Cl.
CPC .......... *G01S 7/4818* (2013.01); *G01S 7/4865* (2013.01); *G01S 17/26* (2020.01)

(58) Field of Classification Search
USPC ...................................................... 356/5.01
See application file for complete search history.

(56) References Cited

U.S. PATENT DOCUMENTS

| | | | | |
|---|---|---|---|---|
| 10,557,940 | B2 * | 2/2020 | Eichenholz | G01S 7/4804 |
| 11,994,466 | B2 * | 5/2024 | Buchter | G01S 7/4816 |
| 12,000,781 | B2 * | 6/2024 | Buchter | G01S 7/4802 |
| 2018/0364356 | A1 | 12/2018 | Eichenholz et al. | |
| 2019/0221988 | A1 * | 7/2019 | Villeneuve | G01S 7/4865 |
| 2021/0055391 | A1 * | 2/2021 | LaChapelle | G01S 7/4917 |
| 2021/0234330 | A1 * | 7/2021 | Gan | H01S 3/0804 |
| 2022/0043202 | A1 * | 2/2022 | LaChapelle | G01S 7/4814 |

(Continued)

FOREIGN PATENT DOCUMENTS

CN     105137451     7/2018

OTHER PUBLICATIONS

International Search Report dated Apr. 9, 2021, for PCT/EP2021/051639, 4 pp.

(Continued)

*Primary Examiner* — James R Hulka
(74) *Attorney, Agent, or Firm* — Alumen IP Law PC

(57) ABSTRACT

A multispectral laser detection and ranging device including a spectral delay unit configured for delaying the broadband laser beam pulse depending on the wavelength, to give a wavelength comb selected in the spectral range, such that the broadband laser beam pulse is transformed into a pulse-train wherein each pulse in the train is at a different wavelength of the wavelength comb.

20 Claims, 15 Drawing Sheets

(56) References Cited

U.S. PATENT DOCUMENTS

| | | | | |
|---|---|---|---|---|
| 2022/0066100 A1* | 3/2022 | Godbout | .............. | G02B 6/2821 |
| 2023/0057064 A1* | 2/2023 | Jaanson | ................. | G01S 7/487 |
| 2023/0341527 A1* | 10/2023 | Manninen | ............. | G01S 7/4814 |

OTHER PUBLICATIONS

Written Opinion of the ISA dated Apr. 9, 2021, for PCT/EP2021/051639, 7 pp.

Jiang Yunshan et al., "Time-stretch LiDAR as a spectrally scanned time-of-flight ranging camera", Nature Photonics, vol. 14. No. 1, Dec. 2, 2019, Submission Pending.

Sun Gang et al., "32-channel hyperspectral waveform LiDAR instrument to monitor vegetation : design and initial performance trials", Proceedings of SPIE, IEEE, US, vol. 9263, Nov. 18, 2014, Submission Pending.

Jiang et al., "Time-stretch LiDAR as a spectrally scanned time-of-flight ranging camera," Nature Photonics, vol. 14, Jan. 2020, pp. 14-18.

Sun et al., "32-channel hyperspectral waveform LiDAR instrument to monitor vegetation: Design and initial performance trials," Proceedings of SPIE, IEEE, US, vol. 9263, Nov. 18, 2014, 7 pages.

* cited by examiner

MULTISPECTRAL LiDAR COMPRISING A SPECTRAL DELAY UNIT

This application is the U.S. national phase of International Application No. PCT/EP2021/051639 filed Jan. 25, 2021, which designated the U.S. and claims priority to US 62/965,751 filed Jan. 24, 2020, the entire contents of each of which are hereby incorporated by reference.

BACKGROUND OF THE INVENTION

Field of the Invention

The invention relates to multispectral LiDAR devices, and more particularly, to multispectral LiDAR devices acquiring data at different wavelengths to allow a recording of a diversity of spectral reflectance from objects.

Description of the Related Art

Light detection and ranging (LiDAR) systems are used to detect and/or measure distances of remote objects. A LiDAR includes a light source, such as a laser, and an optical sensor or a plurality of optical sensors. The light source emits light pulses in a portion or portions of the electromagnetic spectrum: in the infrared, visible, or ultraviolet portions for instance. When a light pulse is reflected by an object, the LiDAR can determine the distance based on the time of flight of a returned light pulse received by the optical sensor.

LiDAR systems usually operate at a monochromatic wavelength measuring the range and the strength of the reflected energy (intensity) from objects. Recently, multispectral LiDAR sensors, which acquire data at different wavelengths, have emerged. This allows for recording of a diversity of spectral reflectance from objects. A multispectral LiDAR emits multiple light pulses with different electromagnetic characteristics, allowing a determination of the material composition of objects.

A problem in multispectral LiDAR is to discriminate spectral information. When a multispectral LiDAR is sending pulses with different electromagnetic signatures, it is important to identify which spectral pulse (e.g. ultraviolet vs. infrared) is returned by an object and detected by the sensor.

A multispectral LiDAR can use spectral filtering of the pulse. This allows to use a single detector, resulting in best available sensitivity. However, filtering reduces the spectral information per pulse by number of wavelength channels.

Alternatively, a multispectral LiDAR can use a dispersive element and a detector array. This requires a complex detection system with reduced sensitivity and increased price compared to single detector.

SUMMARY OF THE INVENTION

Compared to the state of the art, it is proposed a multispectral LiDAR device which may combine the sensitivity and cost efficiency of a single detector multispectral LiDAR without losing spectral information to filtering.

Determining the distance reliably from the time of flight from a single pulse measurement requires relatively high signal to noise ratios (for instance a signal to noise ratio higher than 8). Reducing this requirement by a factor of 4 would result in 100% higher measurement distance with same pulse energy.

An objective of specific embodiments of the invention is to determine the distance of objects returning the pulse even in low signal to noise value situations.

The invention provides a multispectral laser detection and ranging (LiDAR) device, the device comprising,
- an optical input for receiving a broadband laser beam pulse having a spectral range,
- an optical transmitter configured for outputting the broadband laser beam pulse along a direction, the optical input and the optical transmitter being optically connected, and
- an optical receiver configured to receive a reflection of the broadband laser beam pulse from said direction, and
- an optical detector configured to detect a time-of-flight and an optical power of at least part of the reflection of the broadband laser beam pulse, wherein the optical detector is optically connected to the optical receiver, wherein the device further comprises:
- a spectral delay unit configured for delaying the broadband laser beam pulse depending on the wavelength, to give a wavelength comb selected in the spectral range, such that the broadband laser beam pulse is transformed into a pulse-train wherein each pulse in the train is at a different wavelength of the wavelength comb.

In other words, the LiDAR device transforms the outgoing single pulse into a pulse-train, where each pulse in the train is at different wavelength. Thanks to these features, the returning light, or reflected light, can be detected and spectrally discriminated using a single detector and fast digitizer. In addition, detecting the distance using a pulse train will be more robust than with a single pulse using frequency domain-based methods. Indeed, using a pulse train improves the accuracy of distance measurement compared to single pulse when using frequency domain based methods.

One would understand that a reflection of the laser beam refers to either backscattered or specular reflection or combination thereof. One would understand that the wording "optically connected" between two optical modules (input, output, receivers, transmitters, units etc) either means connected by an optical fiber, and/or by optical free space, such that light propagates along an optical path comprising the optical fiber and/or the optical free space between said two optical modules. In an embodiment, the optical input is optically fiber-coupled to the optical transmitter, and the optical receiver is optically fiber-coupled to the optical detector.

The following features, can be optionally implemented, separately or in combination one with the others:

In an embodiment, the optical detector is a broadband unique detector. For instance, the optical detector is a broadband unique sensor.

The optical detector is optically connected to the optical receiver, for instance through optical fibers and a circulator, or the detector may be disposed in optical free space.

There are different ways to produce a time delay. Therefore, the spectral delay unit may comprise different technologies, such as for instance a free-space spectral delay line.

A free-space spectral delay line may require many components, which can increase costs. For instance, a free-space spectral delay line includes a supercontinuum source. The spectral delay unit further comprises, for instance, either a dispersive or a diffractive element, or a set of filters, in optical free space in order to divide the beam into different optical paths, each having a different wavelength range and a different path length. In such embodiments, the free-space spectral delay line further comprises a beam combiner in order to combine the divided beam on the same optical path. Such an embodiment does not require an optical circulator. However, the design may be bulky because reasonable path length differences between channels would be in the order of 0.1 m. The alignment of the optics should be very precise in order to lower the difficulties of reliance on reflective surfaces.

In a preferred embodiment, the spectral delay unit comprises an optical fiber.

In an embodiment, the spectral delay unit comprises a delay input configured to receive the broadband laser beam pulse, and further comprises a delay output configured to transmit the pulse-train, wherein the delay input and the delay output are both a same end of said optical fiber of the spectral delay unit.

In an embodiment, the optical fiber is grated with a fiber Bragg grating (FBG). The FBG is used as a wavelength-specific reflector, in order to reflect light of a wavelength of the wavelength comb.

Alternatively, the spectral delay unit may comprise a set of wavelength filters spatially oriented in free optical space.

Alternatively, the spectral delay unit may comprise an optical fiber having a length of 100 km to 1000 km, such that the chromatic dispersion of the optical fiber is enough to transform the broadband laser beam pulse into the pulse-train by spreading the broadband pulse in time. The advantage of such a solution is that only a long optical fiber is needed.

Compared to such a long optical fiber, the LiDAR device may rather comprise a superstructured Fiber Bragg Grating to introduce spectral delays in either the outgoing or incoming broadband pulse. Compared to the long optical fiber, this solution is lighter, smaller, inexpensive and more practical. The absorptions in the fiber are lighter and, in addition, the spectral dispersion is easier to get on discrete steps instead of quite uniform dispersion.

More precisely, the optical fiber Bragg grating (FBG) may be a superstructured Fiber Bragg Grating comprising a plurality of successive fiber Bragg gratings, wherein the gratings are configured to reflect the wavelength comb part of the broadband laser beam pulse, wherein the length between two adjacent fiber Bragg gratings is selected as a function of a time interval between two adjacent pulses in the train pulses.

Each grating may be formed by grating a periodic variation in the refractive index of the fiber core, which generates a wavelength-specific dielectric mirror, wherein there is a linear relationship between the reflected wavelength and the grating period: the reflected wavelength is equal to the grating period multiplied by the effective refractive index of the grating in the fiber core, multiplied by two.

The delays for delaying the broadband laser beam pulse into a pulse-train can be introduced in the output signal, i.e. in the emitting side of the LiDAR device: it is more practical as the laser source is already emitting inside an optical fiber.

Using a superstructure FBG has many advantages, namely:
   a single detector can be used.
   one can get an higher Signal Noise Ratio (SNR) and a simpler system than by using array detectors,
   every pulse carries spectral information, leading to a more robust spectral classification,
   all (or part) of the optical components of the LiDAR may easily be fiber-coupled, instead of taking into account unpractical mechanical movements of optical components, The manufacturing is scalable, thanks for instance to laser-machining the FBG structures,
   The LiDAR is more robust in general.
   In an embodiment, the LiDAR device further comprises an optical circulator,
   wherein said optical circulator comprises a first port, a second port and a third port, and is configured such that light inputted in the first port is outputted from the second port, and light inputted in the second port is outputted from the third port,
   wherein said same end of the optical fiber is optically connected to the second port of the optical circulator, wherein the first port and the third port of the optical circulator are configured to connect an optical path between the optical input of the device and the optical detector of the device.

In such an embodiment, one can say that the spectral delay unit is arranged on the emitting side of the LiDAR device.

In an embodiment, the first port is fiber-coupled with the optical input, and the third port is fiber-coupled with a scanning module, wherein the scanning module comprises the optical transmitter.

In embodiments, the spectral delay unit may be arranged on the receiving side of the LiDAR device or on the emitting side of the LiDAR device.

In embodiments, the scanning module further comprises the optical receiver, and the optical circulator further comprises a fourth port, configured such that light inputted in the third port is outputted from the fourth port, wherein the fourth port is fiber-coupled with the optical detector.

Alternatively, the optical receiver comprises free space receiver optics arranged on said direction.

In an embodiment, the first port is connected to the optical receiver, and the third port is connected to the optical detector.

In such an embodiment, one can say that the spectral delay unit is arranged on the receiving side of the LiDAR device.

In embodiments, the LiDAR device further comprises a broadband laser source connected to the optical input and configured to send the broadband laser beam pulse to the optical input. The broadband laser source can be a solid-state laser source for instance.

In embodiments, the broadband laser source is not limited to a supercontinuum source. It could be any spectrally broadband light such as Raman lasers or frequency combs.

In embodiments, the broadband laser beam pulse is a supercontinuum (SC) broadband laser beam pulse having a pulse duration comprised between 0.5 ns and 5 ns. Indeed, shorter pulse duration would require a faster detection, which would be more expensive. A longer pulse duration would require a very long delay line, therefore the supercontinuum generation will be inefficient.

Preferably, the pulse duration is about 1 ns. Preferably, the SC bandwidth of the spectral range has a value comprised between 10 nm and 1000 nm. Indeed, the minimum SC bandwidth is 10 nm (when arranged for detecting only water/ice or a specific chemical/material) and the maximum is 1000 nm (when arranged for detecting whole Short-Wave Infrared—"SWIR"—region for best possible multitarget identification).

More preferably, the SC bandwidth has a value comprised between 200 nm and 300 nm. More preferably, the SC bandwidth has a value of 300 nm and the broadband laser beam pulse has a spectral range comprised between 1000 nm and 1700 nm. For instance, a SC bandwidth of 300 nm (for the spectral range 1400-1700 nm) is an optimal for eye-safety and low-cost detection.

In general, a pulse within the pulse train has a filtered bandwidth which is the bandwidth of the spectral range of the broadband laser beam pulse divided by any number N, for instance R may be equal to 4 or 5 or any number higher, as for instance 20 or more.

Assuming a SC pulse duration of 1 ns, a time interval between two adjacent pulses of the pulse-train—which can also be referred to as a time separation of filtered pulses— may be comprised between 1 and 5 ns. One can generalize this ratio R (R being comprised between 1 and 5) between a SC pulse duration (dt), and a time interval as follows: the time interval between two pulses in the pulse train is equal to a duration or R*dt (Therefore the time interval is comprised between 1*dt and 5*dt).

Preferably, a pulse within the pulse train has a filtered bandwidth which is the bandwidth of the spectral range of the broadband laser beam pulse divided by 4 or 5. In other words, the bandwidth of a time-separated pulse of the pulse-train is optimally SC bandwidth divided by 4 or 5, thus for a SC bandwidth equal to 300 nm, a filtered bandwidth of 40-80 nm per pulse of the pulse-train is ideal.

The invention further provides a vehicle comprising a device as disclosed.

BRIEF DESCRIPTION OF THE DRAWINGS

Other features, details and advantages will be shown in the following detailed description and on the figures, on which.

DESCRIPTION OF THE PREFERRED EMBODIMENTS

Figures and the following detailed description contain, essentially, some exact elements. They can be used to enhance understanding the invention and, also, to define the invention if necessary.

For the sake of conciseness, the elements which are similar or equivalent through the description will be described with reference to the same reference numbers.

An advantage of the LiDAR as disclosed is to ease the discrimination of spectral information with a unique optical sensor.

To achieve this aim, a LiDAR as disclosed may be configured to transform an emitted broadband laser beam pulse 1 into a pulse-train. Preferably, the broadband laser beam pulse 1 is a supercontinuum. The broadband laser beam pulse 1 is intended to be projected by the LiDAR on an obstacle to detect, whereas the pulse-train is intended to be received on the unique optical sensor.

Spectral Delaying of a Broadband Pulse

Figure 1:
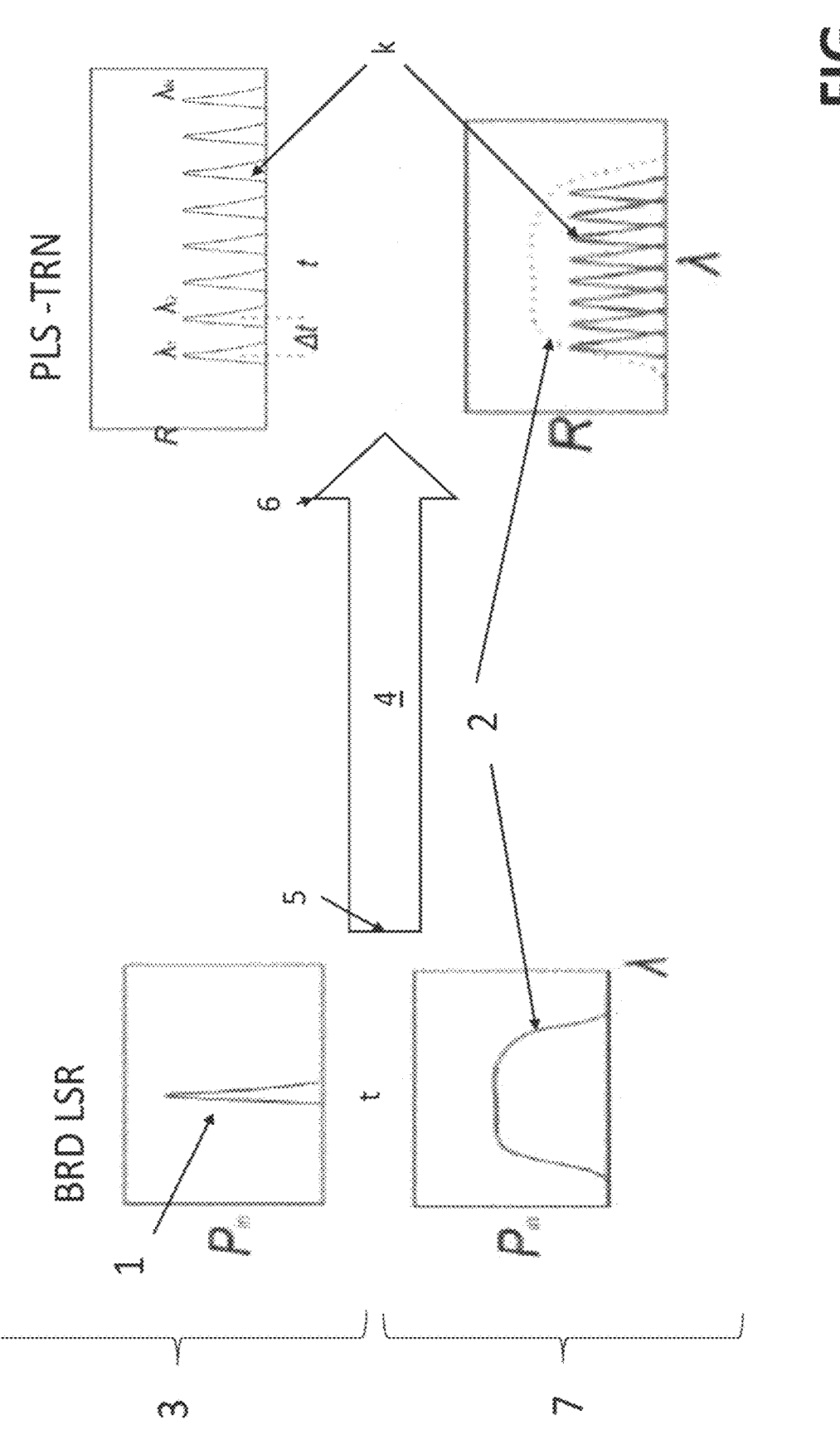
FIG. 1 is a functional schematics of a spectral delay unit in temporal space and in spectral space.

Such a LiDAR may comprise a spectral delay unit 4 as represented on FIG. 1.

One can see on the left side of FIG. 1 a representation, in the temporal space 3, of the emitted broadband laser beam pulse 1. As represented in the spectral space 7, the emitted broadband laser beam pulse 1 has a spectral range 2.

The emitted broadband laser beam pulse 1 is introduced inside the spectral delay unit 4 through a delay input 5.

The spectral delay unit 4 is configured for delaying the emitted broadband laser beam pulse 1 as a function of the wavelength, within a wavelength comb selected in the spectral range 2. Such a wavelength comb is represented (in the spectral space 7) on the right side of FIG. 1.

Therefore, the broadband laser beam pulse 1 is transformed by the spectral delay unit 4 into a pulse-train wherein each pulse in the train is at a different wavelength of the wavelength comb. The pulse-train is represented (in the temporal space 3) on the right side of FIG. 1.

The pulse-train is then transmitted through a delay output 6 of the spectral delay unit 4.

In the example, the number of pulses of the pulse train, i.e. of wavelength channels, is N=8 channels. Each pulse has a rank k, where k is selected from 1 to N=8.

The pulse of rank k is delayed from the pulse of previous rank from the time interval $\Delta t$ (which can also be written as: "DELTA_t"). For instance, the time interval $\Delta t$ is a constant.

The pulse of rank k is filtered to correspond to the wavelength $\lambda_k$ (which can also be written as: "lambda_k").

As an example, the number of channels represented on FIG. 1 is N=8, but any other number N of channels may be provided in general.

Superstructure Fiber Bragg Gratings

Figure 2:
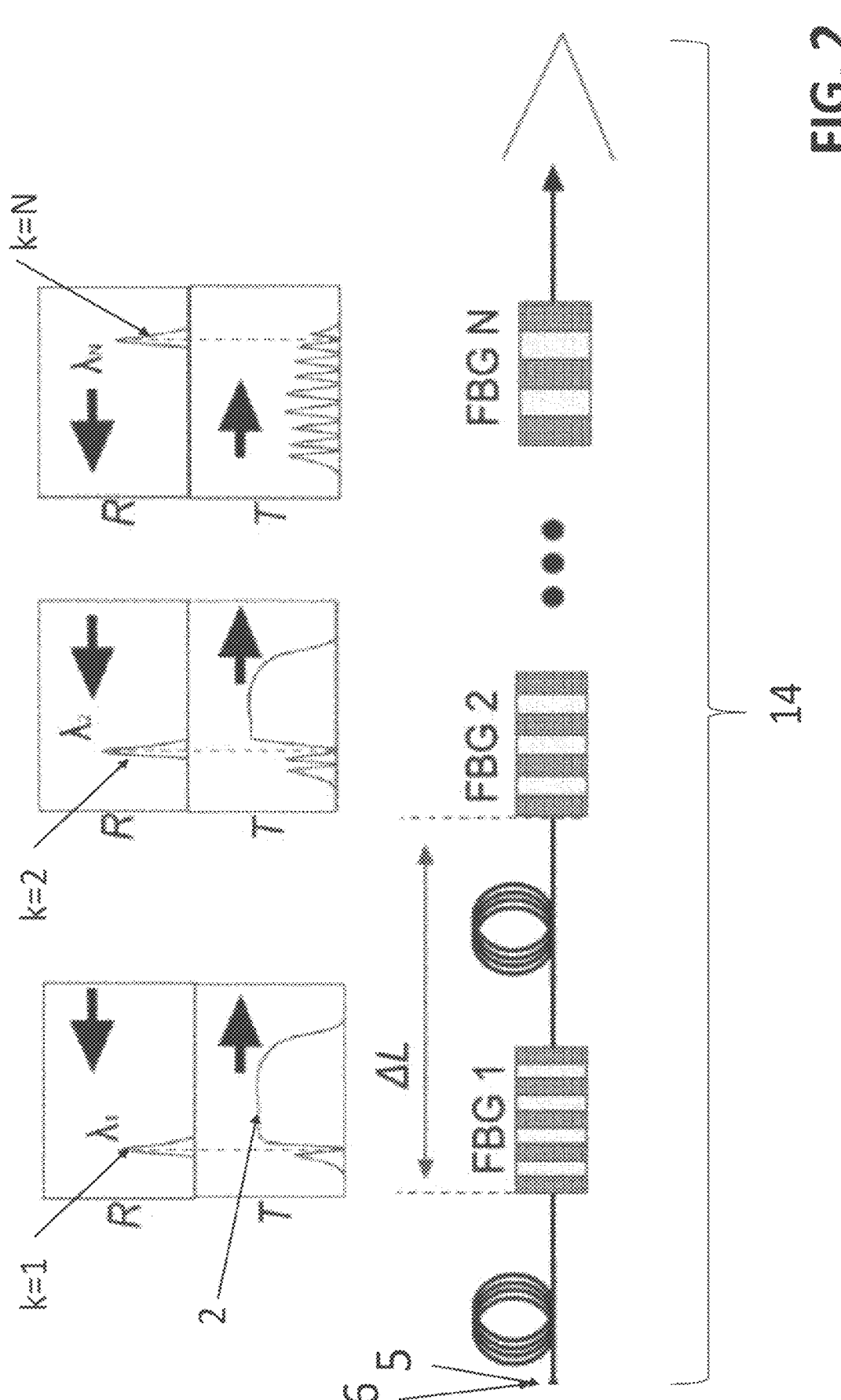
FIG. 2 is a functional schematic of a superstructure FBG and of its functioning as a spectral delay unit on the spectral space.

In an advantageous embodiment of the disclosure, the spectral delay unit 4 is an optical fiber of kind superstructured fiber Bragg grating (FBG) 14, as represented on FIG. 2. The superstructured FBG 14 is formed by an optical fiber which is grated by a series of successive ranked FBG of rank k. A FBG is spaced from the FBG of next rank above by a space interval ΔL (which can also be written as: "DELTA_L"). For instance, the space interval ΔL is a constant.

On FIG. 2, and above each corresponding representation of FBG of rank k, a spectrum T of the transmitted light and a spectrum R of the reflected light are represented. The arrows represent the direction of propagation of the light: transmitted from left to right, and reflected from right to left.

As one can see, each FBG of rank k is tuned for a different wavelength $\lambda_k$, such as to reflect a narrow spectral band of light centered on the wavelength $\lambda_k$ within the spectral range 2. On the example of the FIG. 2, only the gratings of the rank k=1, rank k=2 and rank k=N are represented.

At each FBG of rank k, only a pulse of rank k is reflected, and the rest of the light is transmitted to the FBG of next rank.

Therefore, the reflected narrowband light pulses will be separated in time, due to the time it takes for light to travel twice the distance between successive FBGs. Namely, the time interval Δt between two successive pulses is equal to twice the space interval ΔL, multiplied by n/c, wherein n is the index of the optical fiber, and c is the speed of the light in void. For instance, with an index of n=1.5 and a space interval ΔL equal to 30 cm, one get a time interval Δt equal to 3 ns.

Thus, the initial broadband laser beam pulse 1 is divided into the series of narrowband light pulses. This is advantageous because it allows spectral discrimination by resolving the pulses with a single fast detector.

Preferably, but optionally, the FBGs are arranged as on FIG. 2, i.e. such that the selected wavelength $\lambda_k$ of a pulse of rank k is an available wavelength of the wavelength comb next to the pulse of immediate previous rank.

In this embodiment, the delay input 5 and the delay output 6 of the are the very same end of the superstructured FBG 14 optical fiber.

Examples of LiDAR Devices with a Spectral Delay Unit

As represented on FIGS. 3 to 8, it is provided examples of multispectral LiDAR devices taking advantage of the above-described superstructured FBG 14.

Each represented multispectral LiDAR device comprises:
a supercontinuum laser source 17 for emitting the broadband laser beam pulse 1 into an optical input 8 of the LiDAR device,
an optical transmitter 11 configured for outputting light on an obstacle 102 to detect, and
an optical receiver 9 configured to receive a reflection of the outputted light from the obstacle 102, and
an optical detector 16 configured to detect a time-of-flight and an optical power of the reflection,
an superstructured FBG 14 line for transforming the broadband laser beam pulse 1 into the pulse-train as explained with reference to FIGS. 1 and 2,
an optical circulator 13 having at least two ports in order to connect at least some of the previous elements through optical fiber.

Figure 3:
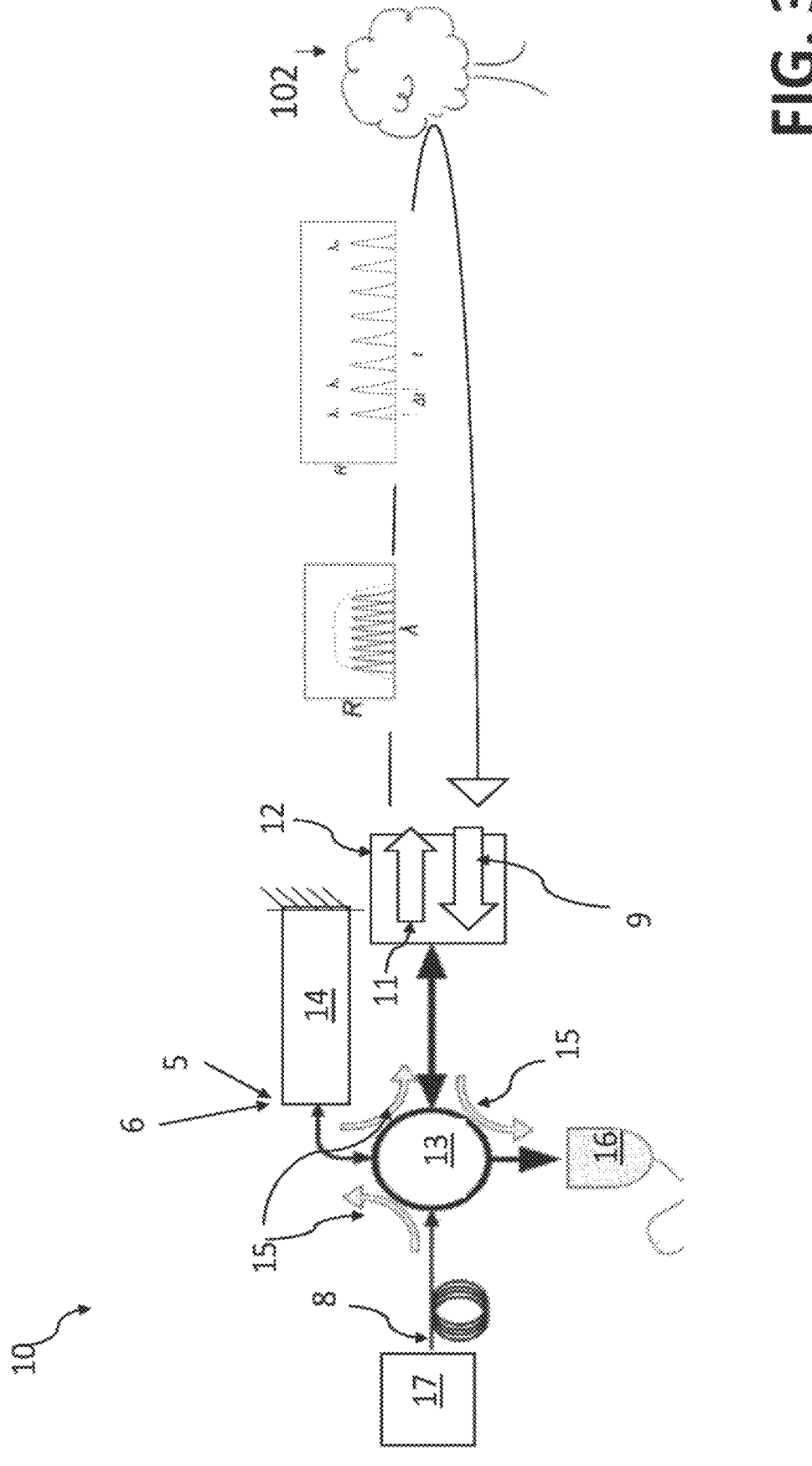
FIG. 3 is an optical functional schematic of a multispectral LiDAR device according to a first embodiment, wherein a spectral delay unit comprising a superstructured FBG is arranged on the transmitter side.

More specifically, on FIG. 3, the superstructured FBG 14 line is arranged on the emitting side of the represented multispectral LiDAR device 10.

A first port of the optical circulator 13 is fiber-coupled with the optical input 8, a second port is fiber-coupled to the superstructured FBG 14 line, the third port is fiber-coupled with a scanning module 12, and the fourth port is fiber-coupled with the optical detector 16. The arrows 15 represent the propagation of light inside the optical circulator 13.

The scanning module 12 comprises both the optical transmitter 11 and the optical receiver 9.

Advantageously, introducing the delays in the signal prior that the signal arrives to the scanning module 12 for scanning the obstacle 102 is practical, because the supercontinuum laser source 17 is already emitting inside an optical fiber.

For instance, the supercontinuum laser source 17 can be a solid-state laser source.

Figure 4:
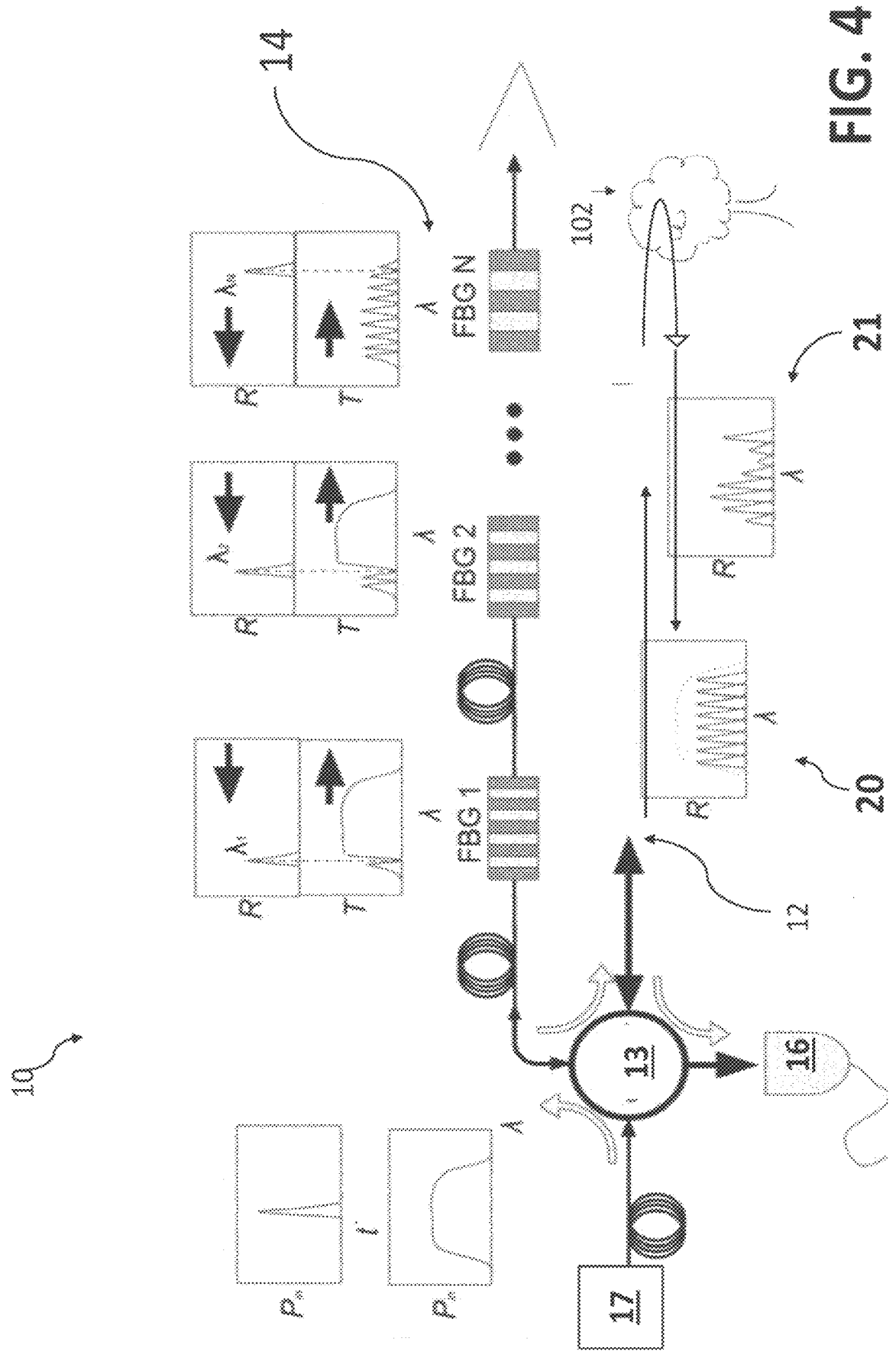
FIG. 4 is a schematic of the FIG. 3 with illustrations of spectral space at the different step of propagation of an initial broadband pulse.

FIG. 4 represents the same multispectral LiDAR device 10 as FIG. 3, additionally to the spectrum of the light at each step of the propagation from the supercontinuum source 17.

The spectrum 20 is a schematic of the train of monochromatic pulses generated and emitted by the multispectral LiDAR device 10 at the output of the scanning module 12. The spectrum 21 is a schematic of the reflected train of monochromatic pulses received by the multispectral LiDAR device 10.

Namely, one can compare the spectrum 20 of the pulse-train to the spectrum 21 of the pulse-train reflected by the obstacle 102: depending on the wavelength channel, the light of the corresponding pulse is more or less absorbed by the obstacle 102.

The optical detector 19 receives the reflected train of pulses and distinctly detects an optical power for each peak, therefore for each wavelength. Therefore, the single optical detector 19 enables acquiring spectral information about the obstacle 102.

For instance, the optical detector 19 is a single sensor comprising an avalanche photodiode (APD) electrically connected to a digitizer having a sample rate of 3 GS/s, and to Field Programmable Gate Arrays (FPGA).

Some computation may be programmed to recover the time-of-flight of a pulse (for instance a monochromatic pulse), and thus the distance of a part of the obstacle 102 which is reflective to the pulse (for instance the monochromatic pulse). For instance, the computation comprises Fast Fourier Transform (FFT) based cross correlation.

The amplitude of the optical power of each detected peak is compared with the spectrum of the emitted broadband laser pulse.

This step may require multiple stages and a demultiplexer. For instance, in a 1st stage, one can use a fast transimpedance amplifier, and in further stages, a demultiplexer into N slower (integrating) amplifiers.

Figure 5:
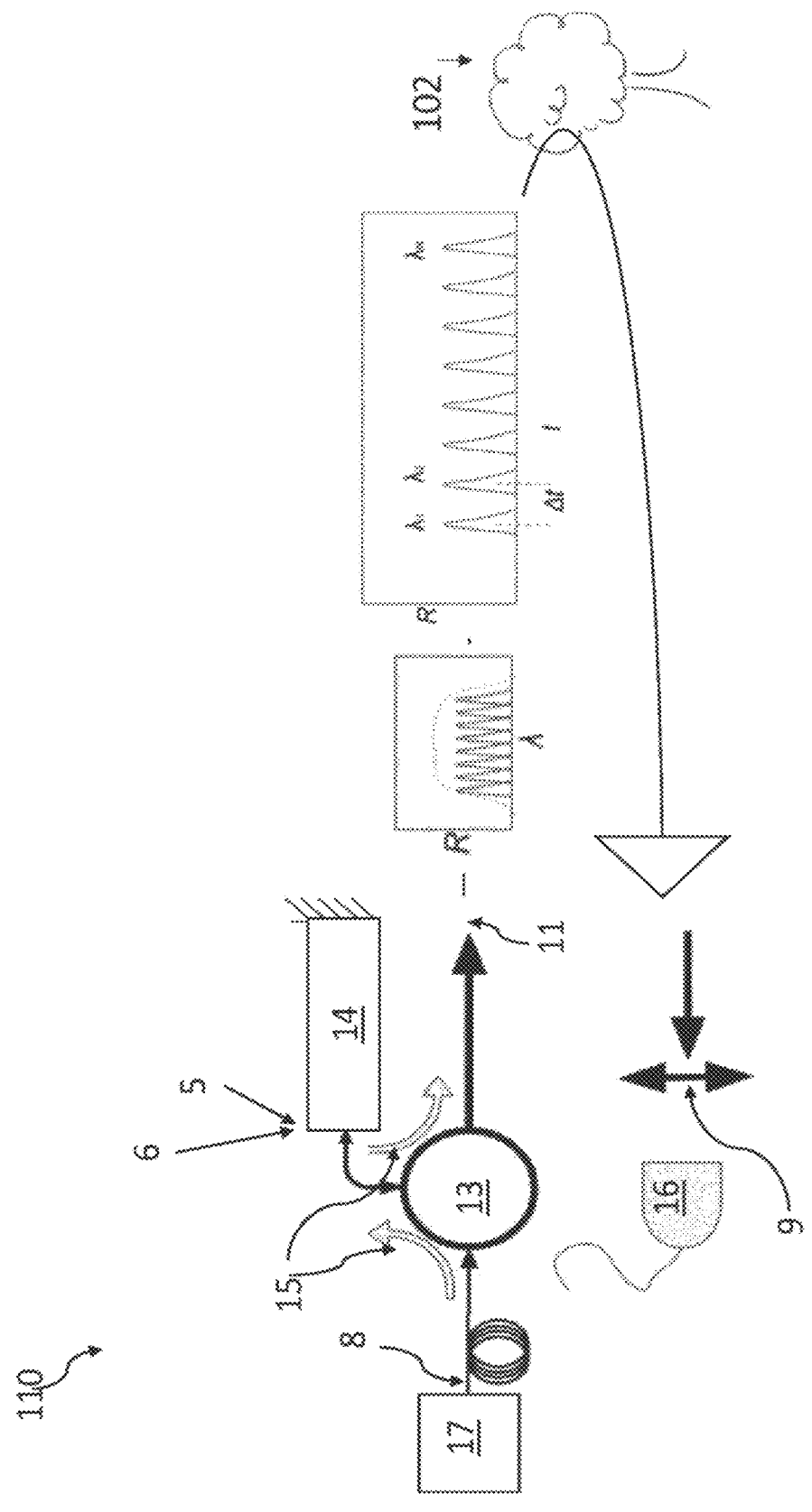
FIG. 5 is an optical functional schematic view of a multispectral LiDAR device according to a second embodiment, wherein a spectral delay line comprising a superstructured FBG is also arranged on the transmitter side, but the detection on the receiver side is performed in free optical space.

In a variant represented on FIG. 5, the superstructured FBG 14 line is also arranged on the emitting side of the represented multispectral LiDAR device 110, for the same advantages as already stated.

A difference with the multispectral LiDAR device 10 of FIG. 3 is that the third port of the optical circulator 13 is directly fiber-coupled to the optical transmitter 11. In this embodiment, the optical receiver 9 may be a free optical space lens which focus the received light onto the optical detector 16.

Figure 6:
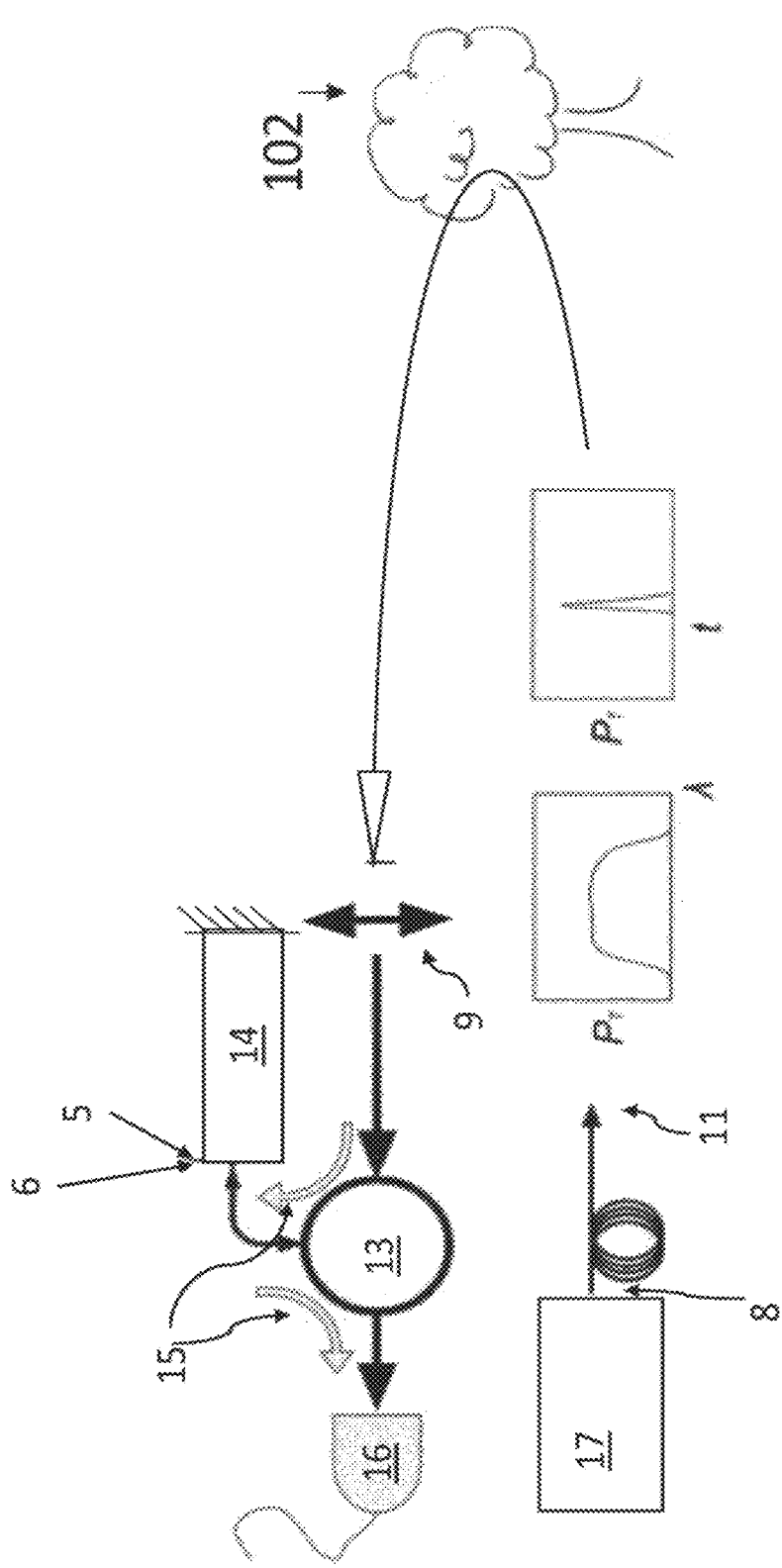
FIG. 6 is an optical functional schematic view of a multispectral LiDAR device according to a third embodiment, wherein a spectral delay line comprising a superstructured FBG is arranged on the receiver side.

In a variant represented on FIG. 6, by contrast with the two examples of multispectral LiDAR devices above-described, the superstructured FBG 14 line is arranged on the receiving side of the represented multispectral LiDAR device 111. Introducing the delays on the receiver side is equivalent from an optics perspective, since the delays are introduced by passive components.

Hence, a difference with the multispectral LiDAR device 10 of FIG. 3 is that the optical transmitter 11 directly project the light from the supercontinuum laser source 17 on the obstacle 102. In such a configuration, the supercontinuum laser source 17 is not fiber-coupled to the optical circulator 13 but instead, directly fiber-coupled to the optical transmitter 11.

In this embodiment, the optical receiver 9 may be a free optical space lens which focus the received light inside an optical fiber which is fiber-coupled to a first port of the optical circulator 13. The second port is fiber-coupled to the superstructured FBG 14 and the third port is fiber-coupled to the optical detector 16.

In general, the optical transmitter 11 or the optical receiver 9 may be either fiber coupled or operating in free space. Detection can be either in bi-static or monostatic configuration.

Figure 7:
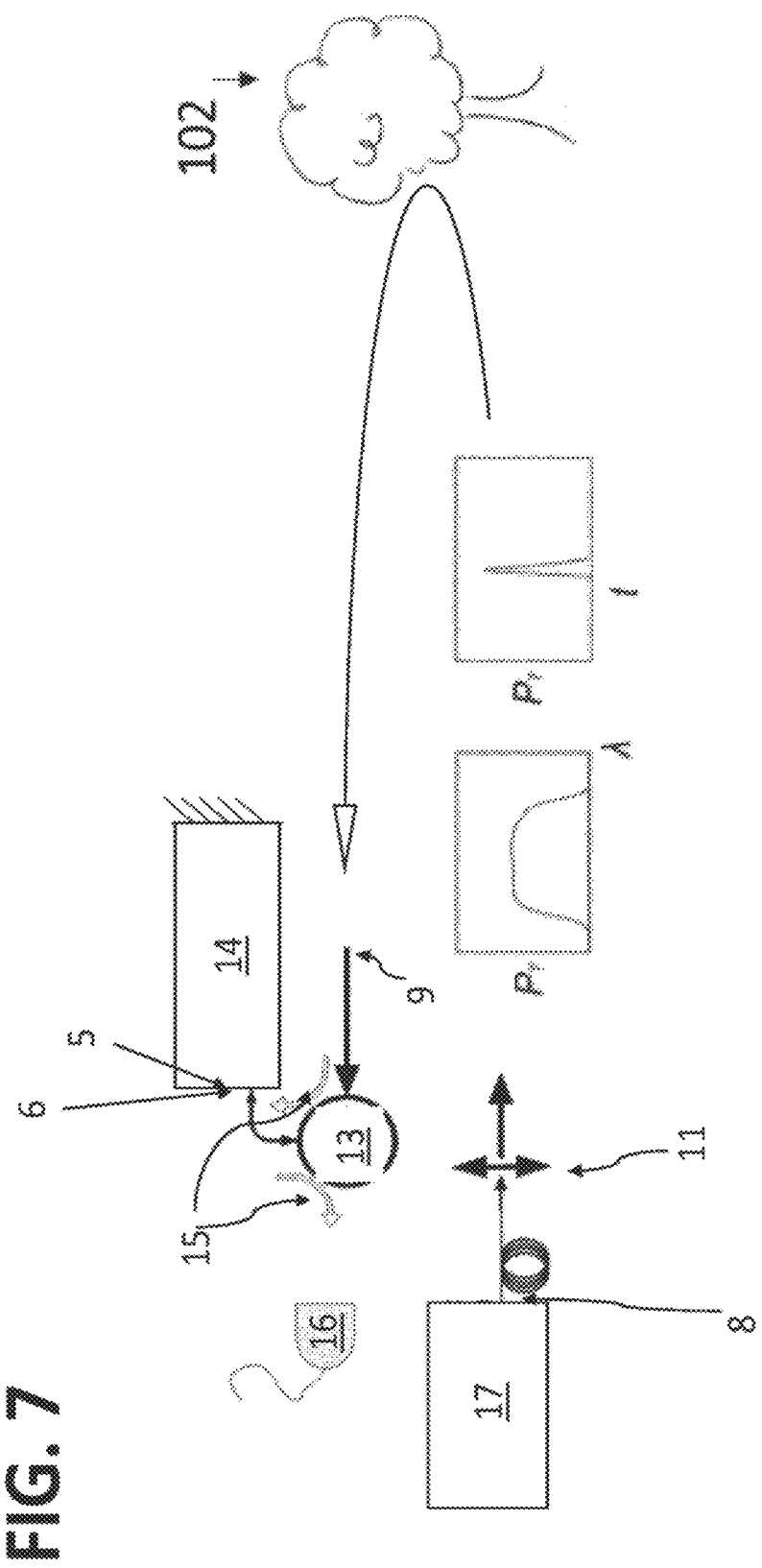
FIG. 7 is an optical functional schematic view of a multispectral LiDAR device according to a fourth embodiment.

In a variant represented on FIG. 7, some other modifications have been brought to the arrangement of the LiDAR device 111 of FIG. 6. Namely, instead of the optical receiver 9, it is the optical transmitter 11 which may be a free optical space lens. Further, the optical detector 16 also operates on free space.

Figure 8:
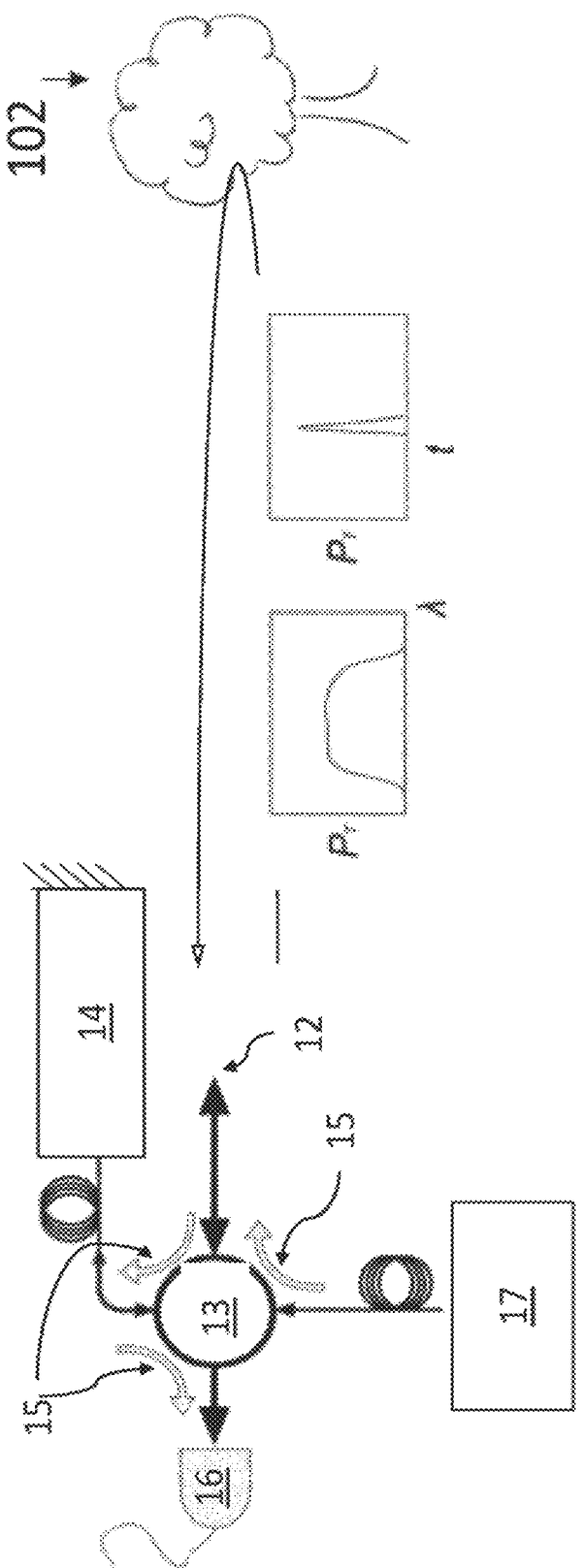
FIG. 8 is an optical functional schematic view of a multispectral LiDAR device according to a fifth embodiment.

In a variant represented on FIG. 8, some modifications have been brought to the arrangement of the LiDAR device 10 of FIG. 3. Namely, the second port is fiber-coupled to the scanning module 12 and the third port is fiber-coupled with the superstructured FBG 14 line, which is the permuted configuration as on FIG. 3.

For the sake of comprehension, the spectrum and temporal envelope of the signal transmitted on the obstacle 102 is schematized on the FIGS. 3 to 8, in order to make it clear when the signal transmitted on the obstacle 102 is the initial broadband laser pulse 1 or the pusle-train.

The various LiDAR devices above described enable the returning light to be detected and spectrally discriminated using a single optical detector 16 and fast digitizer. In addition, detecting the distance using a pulse train will be more robust than with a single pulse using frequency domain-based methods.

Variants of Spectral Delay Unit 4

In the description hereinabove, the spectral delay unit 4 was a superstructure FBG 14. In general, other technologies may be employed to obtain the result of both spatially and spectrally divide a single incoming broadband pulse. Similarly to the various LiDAR devices above described, said technologies may be provided either on the transmitter side or on the receiver side of the LiDAR devices.

Figures 9, 10, 11:
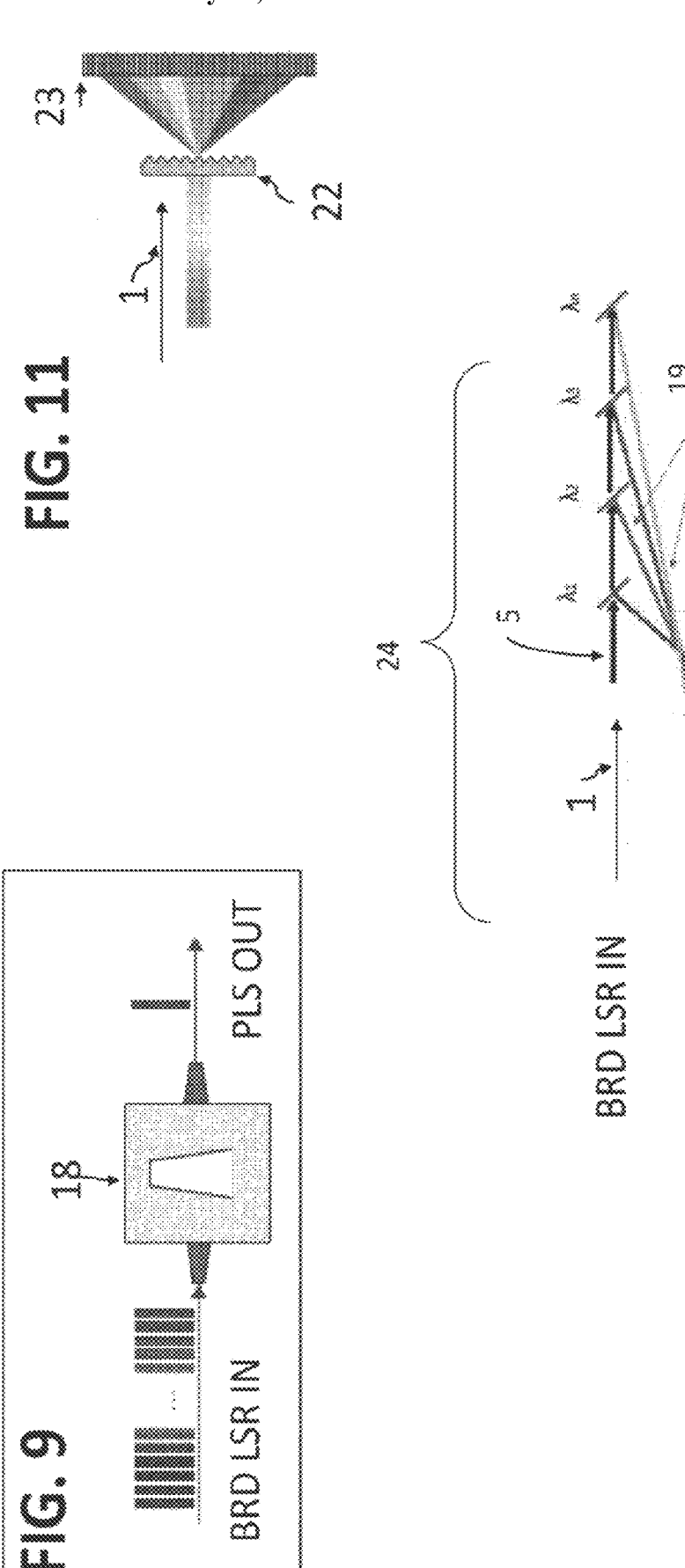
FIG. 9 is a schematic of a spectral delay unit according to a variant, which comprises a tunable filter.
FIG. 10 is a schematic of a spectral delay unit according to another variant, which operates on free optical space.
FIG. 11 is an illustration of a free-space alternative to the use of a spectral delay unit.

For instance, the spectral delay unit 4 may comprise a spectral bandpass filter such as the tunable filter 18, as represented on FIG. 9. The broadband incoming light at the left is filtered to get a wavelength-specific pulse at the right of the Figure. The tunable filter 18 may be tuned to a successive wavelength after each time interval, in order to produce the pulse-train.

The tunable filter 18 may be arranged either to transform the light transmitted to the obstacle 102 into a pulse-train, or to transform the light received from the obstacle 102.

Advantageously, a single detector can be used, which leads to a simpler system, and enables a higher Signal/Noise Ratio (SNR) than filtering the light through an array. Moreover, the tunable filter 18 is easy to optically align on the optical axis (namely when fiber-coupled).

One can remark that, compared to a tunable filter 18, the superstructure FBG 14 is advantageous. Indeed, the superstructure FBG 14 does not require to operate mechanical movements and enable to increase the number of spectral channels per supercontinuum pulse from 1 spectral channel to any number N.

For instance, the spectral delay unit 4 may be a free-space spectral delay line 24. In general, a free-space spectral delay line 24 may include a supercontinuum source, a set of filters which divide the beam into different paths each at different wavelength range and having different path length, and a beam combiner.

An example of free-space spectral delay line 24 is represented on FIG. 10. The broadband incoming laser pulse 1 is transmitted through successive notch filters of rank k, which are each configured to transmit all but a different specific wavelength. The part of the pulse which is not transmitted is reflected to a specific direction by a wavelength-specific mirror in free optical space, then re-directed to a unique direction by use of another mirror, such that all the wavelength channels are re-collected and transmitted to the single direction.

Thanks to this configuration, one can get different path lengths 19, which cause delays between spectral channels. At the delay output 6, the outgoing pulses each have a wavelength separated in time, without the use of an optical circulator 13.

For the sake of comparison, FIG. 11 illustrates an alternative to the use of a spectral delay unit 4. In this alternative, in order to spatially discriminate the wavelength channels, no delay is introduced. Instead, the reflected broadband laser pulse 1 is transmitted in optical free space to a dispersive element 22, such as a grating or a prism. The dispersed light is detected to an array of detectors 23, each detector being dedicated to a wavelength which is deviated to it by dispersion.

The spectral delay unit 4 is very advantageous compared to this alternative. For instance, the spectral delay unit 4 is less complex because it only requires a single detector. Moreover, array detectors generally have a factor of 10 lower SNR than corresponding single detectors. Array detectors multiply the costs compared to a single detector. Further, components in array detectors may be fragile compared for instance to a superstructure FBG 14.

Simulation Results

For documentary references, and with reference to FIGS. 12 to 17, there is provided some simulation results demonstrating various advantages and feasibility of a multispectral LiDAR operating with a spectral delay unit 4.

Figure 12:
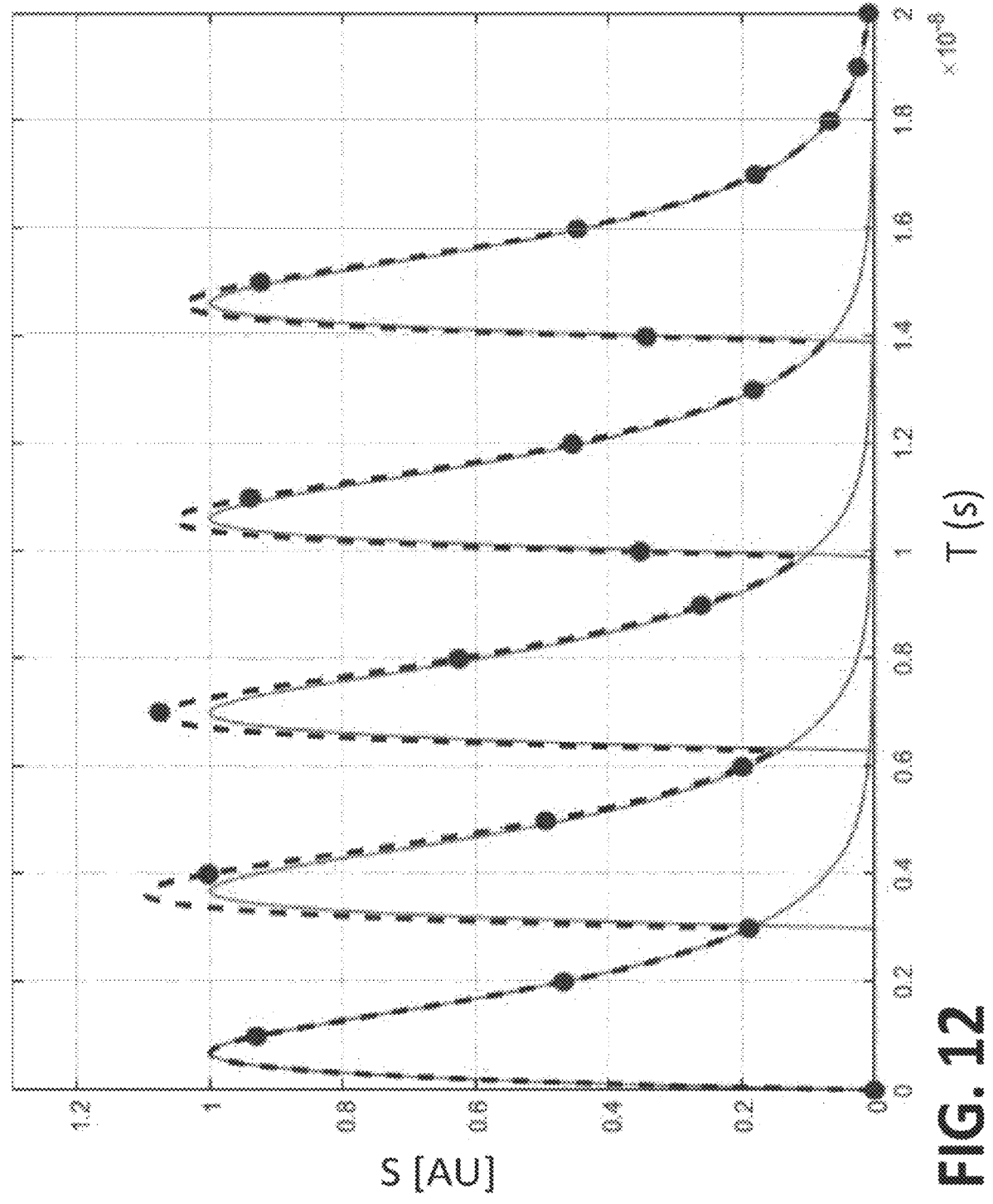
FIG. 12 represents a simulation of a signal of generated pulse-train.

FIG. 12 represents a simulation of a signal S (arbitrary unit) over the time T (s). The plain line represents the ADP response to single pulses. The round markers represent the digitized signal. The dotted line represents the envelope.

The simulated pulse-train and single pulse where generated with the following hypothesis: the APD bandwidth is 1 GHz, the digitizer sampling rate is 1 GS/s, the delay between the 1st and the 2nd spectral channel is 3 ns, and each successive time interval is 10% longer than previous. For single pulse the first pulse of the train was used.

Figure 13:
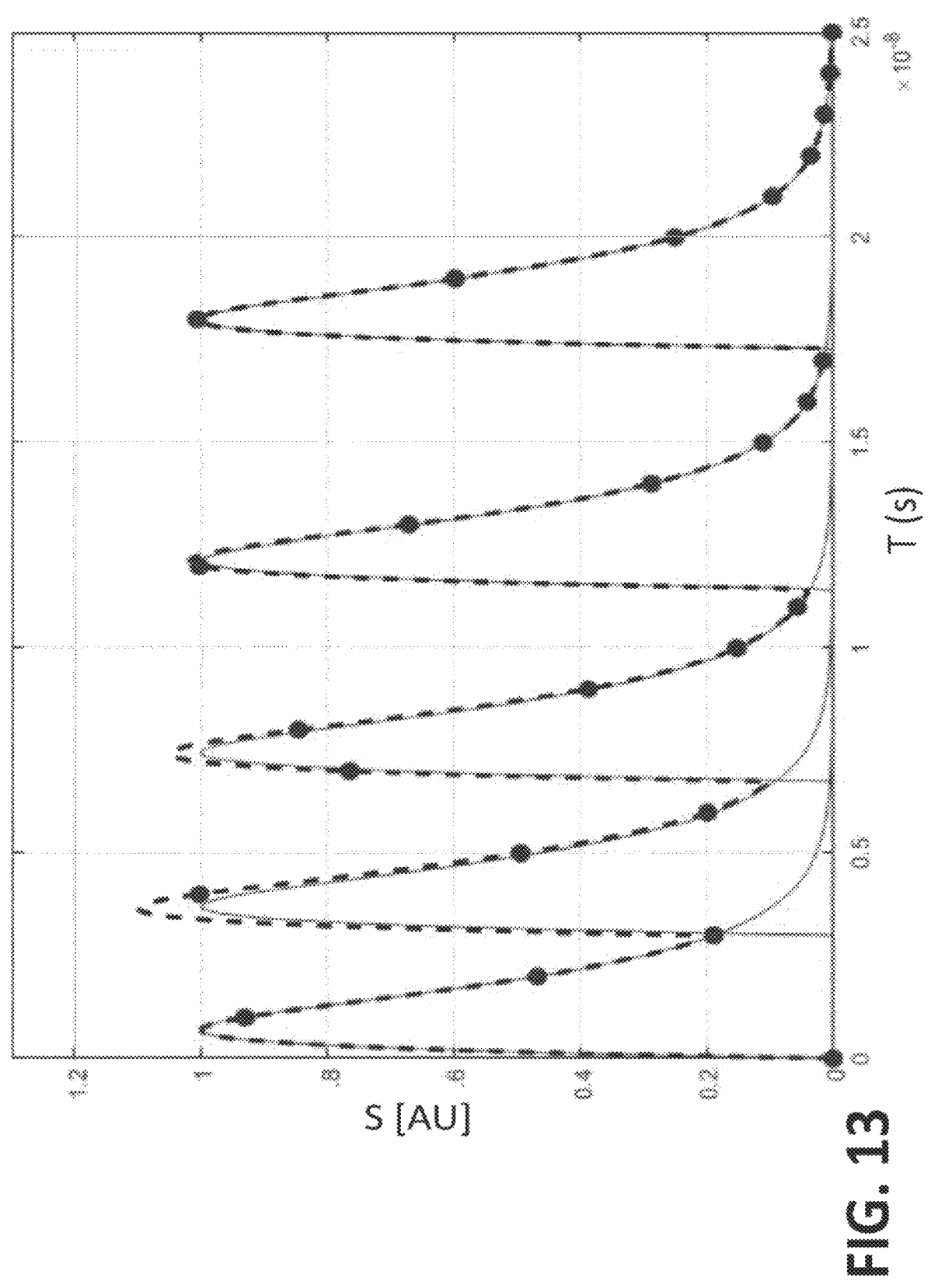
FIG. 13 represents a simulation of a signal of generated pulse-train with variable time interval values between successive pulses.

FIG. 13 represents another simulation of the signal S (arbitrary unit) over the time T (s). One can see that the results improve when increasing the successive time intervals between successive pulses in the train from 10% to 25%.

Figure 14:
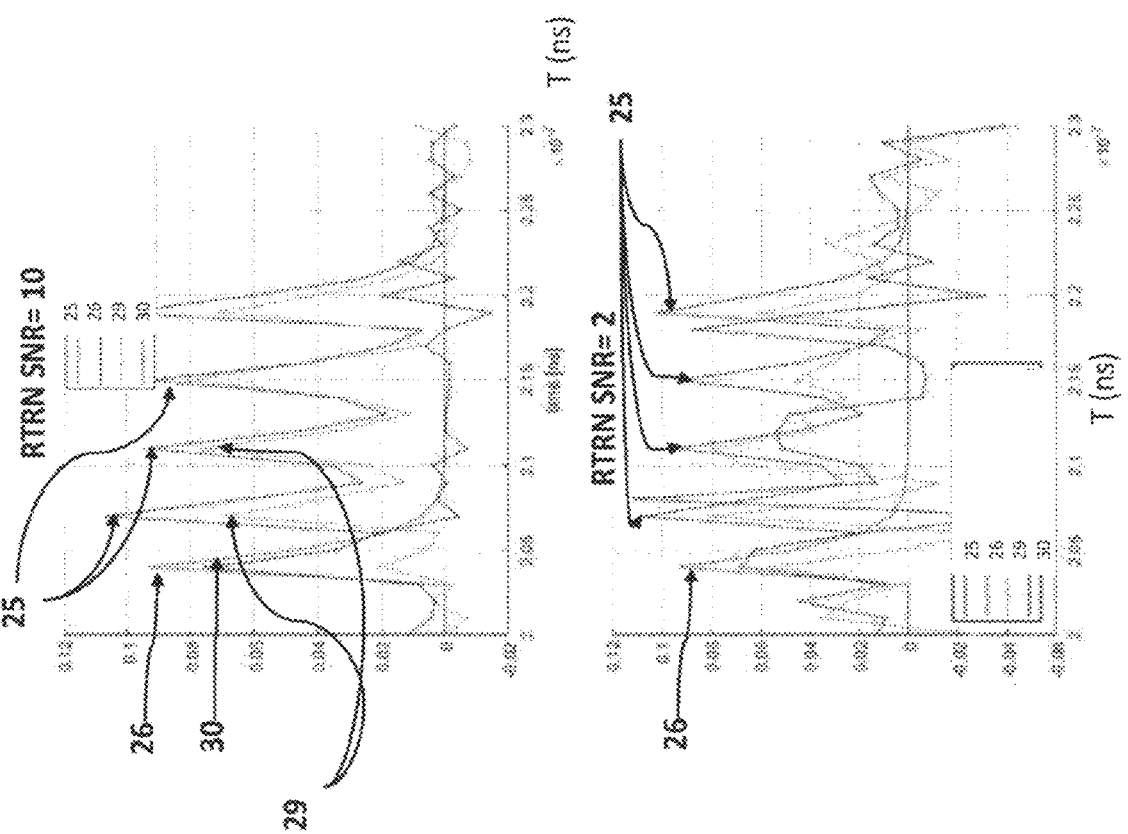
FIG. 14 represents simulations of transmitted and returned pulses over the time.
Figure 14:
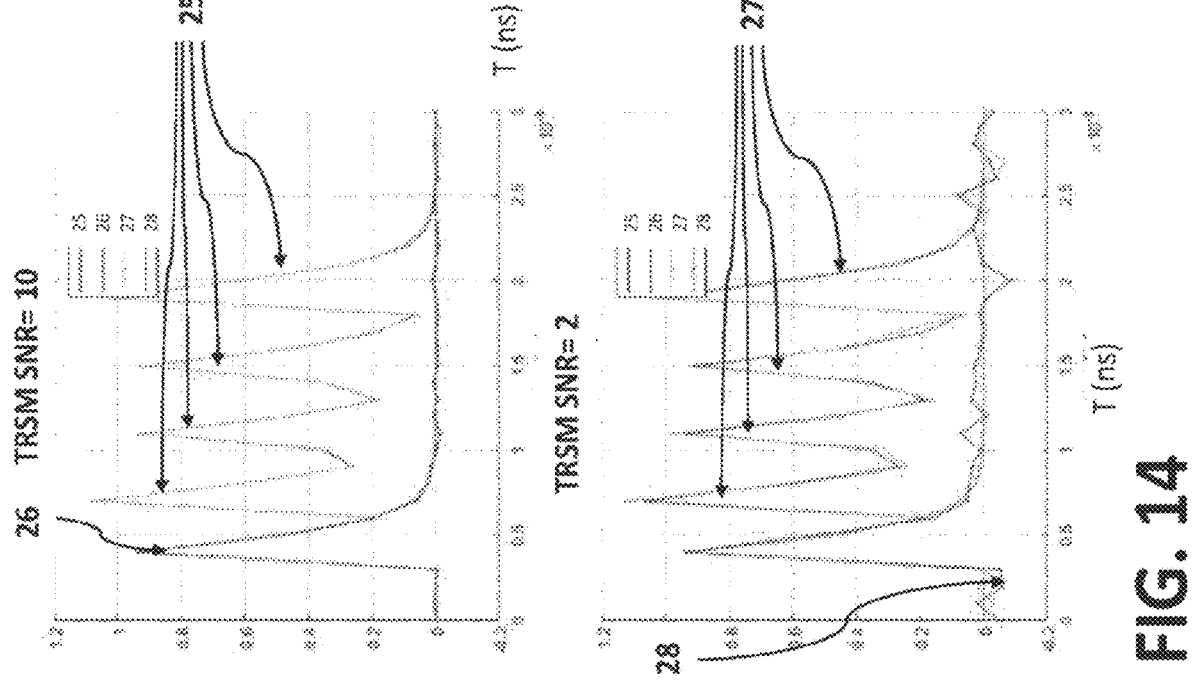

FIG. 14 represents simulations of transmitted and returned pulses over the time T (ns).

On the left, the simulations correspond to transmitted signals. There is printed for reference an ideal pulse train 25, and ideal single pulse 26. There is also printed simulations of a noisy pulse train 27, and of a noisy single pulse 28. The simulation above is performed with assumption that the SNR is equal to 10, whereas the simulation below is performed with assumption that the SNR is equal to 2. One can see that even with a lower SNR (SNR=2), the noisy single pulse 28, respectively the noisy pulse train 27, are almost perfectly superposed to the ideal pulse train 25, respectively ideal single pulse 26.

On the right, the simulations correspond to returned signals corresponding to the simulated transmitted signals: the simulation above is performed with assumption that the SNR is equal to 10, whereas the simulation below is performed with assumption that the SNR is equal to 2.

In addition to the ideal pulse train 25, and ideal single pulse 26, there are printed simulation of noisy reflected weighted pulse train 29 and noisy reflected weighted pulse train 30.

For a SNR equal to 10, the simulated noisy reflected pulses are corresponding to the temporal position of their simulated ideal counterparts, and the power peak is well defined for each of them.

By comparison, for a lower SNR, equal of 2, the simulated noisy reflected weighted pulse train 29 is more difficult to interpret as different well-defined peaks.

The simulation hereinabove described have been performed under the following assumptions: a random gaussian noise is added to the spectrum with standard deviation of expected pulse amplitude/SNR, for the expected pulse amplitude: each pulse is weighed by a random reflectance value between 0.10 and 0.9 with the expected value of 0.5. For each SNR and pulse type (train vs single) combo, 10 000 simulated traces were generated.

Figure 15:
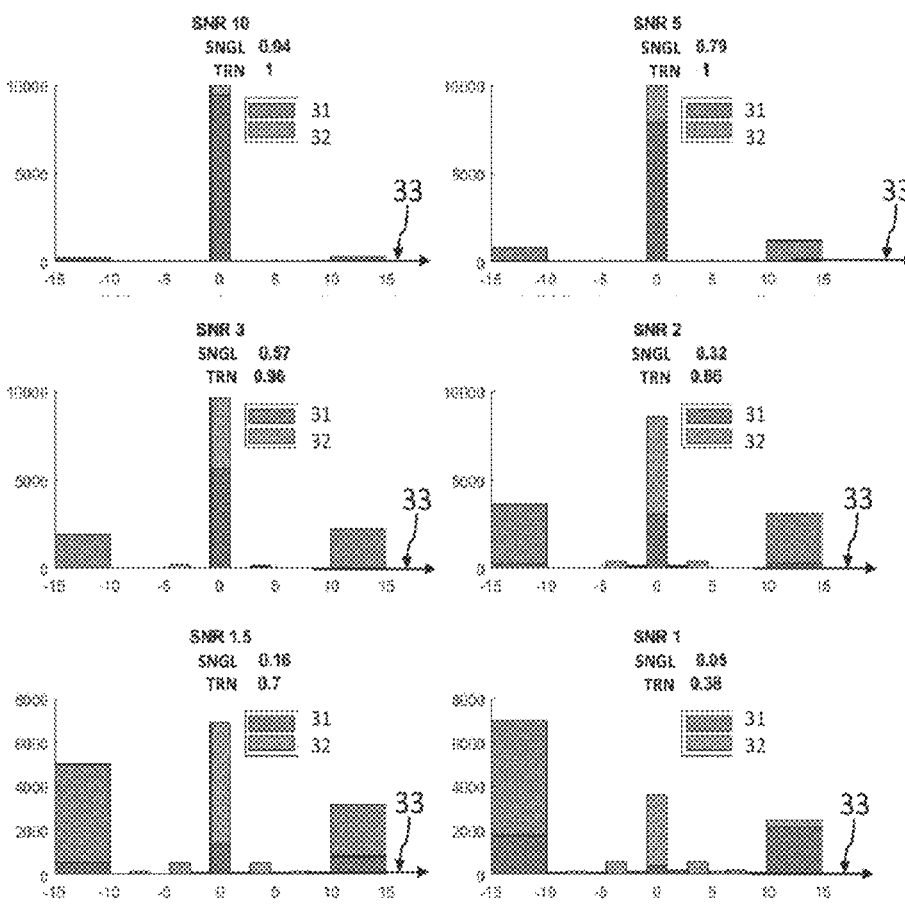
FIG. 15 represents histograms of error in measuring the time of flight of the pulses at several SNR values, using single pulse and pulse train.

FIG. 15 represents histograms of error in measuring the time of flight of the pulses at several SNR values, using single pulse and pulse train. The histogram represents repartitions on an axis 33 of error in the time-of-flight (TOF) estimate relative to sampling period. Below the value of the SNR on each histogram, a first value represents the Hitrate of single pulse, above a second value which represents the Hitrate of the pulse-train. The assumptions made are following:

Unit-sampling period (1 ns in this case).

The time of flight estimate is always more accurate with pulse train.

At SNR<5 errors corresponding to integer times the delay in the spectral channels can be seen. Most likely the performance can be optimized by modifying the spectral channel delays and/or increasing sampling rate.

Figure 16:
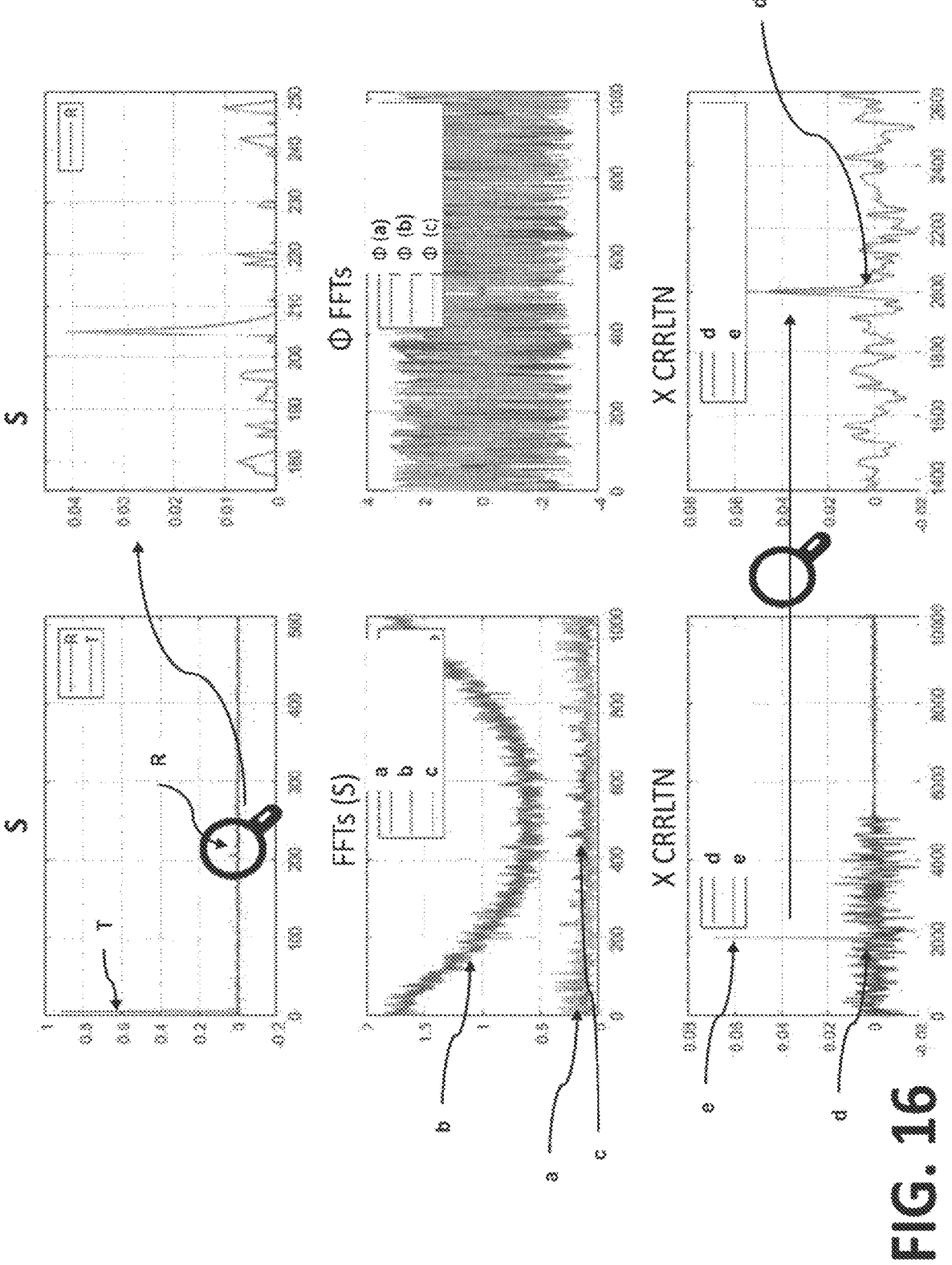
FIG. 16 represents graphs of the simulation of different characteristics of the signal of a single pulse.

FIG. 16 represents graphs of the simulation of the signals S of a single pulse:

transmitted signal T and reflected signal R,

FFTs of the signal S: absolute values of a—FFT(R, n), b—conj [FFT(T, n)], and c—the product of the above, the phase φ (which can also be written: "PHI") of the above FFTs, and the Cross correlation X: d—real part of the ifft of the product above; e—max.

The assumption is a SNR=10. Zooms on the graphs are represented, which are indicated by a magnifying glass icon and arrows.

Figure 17:
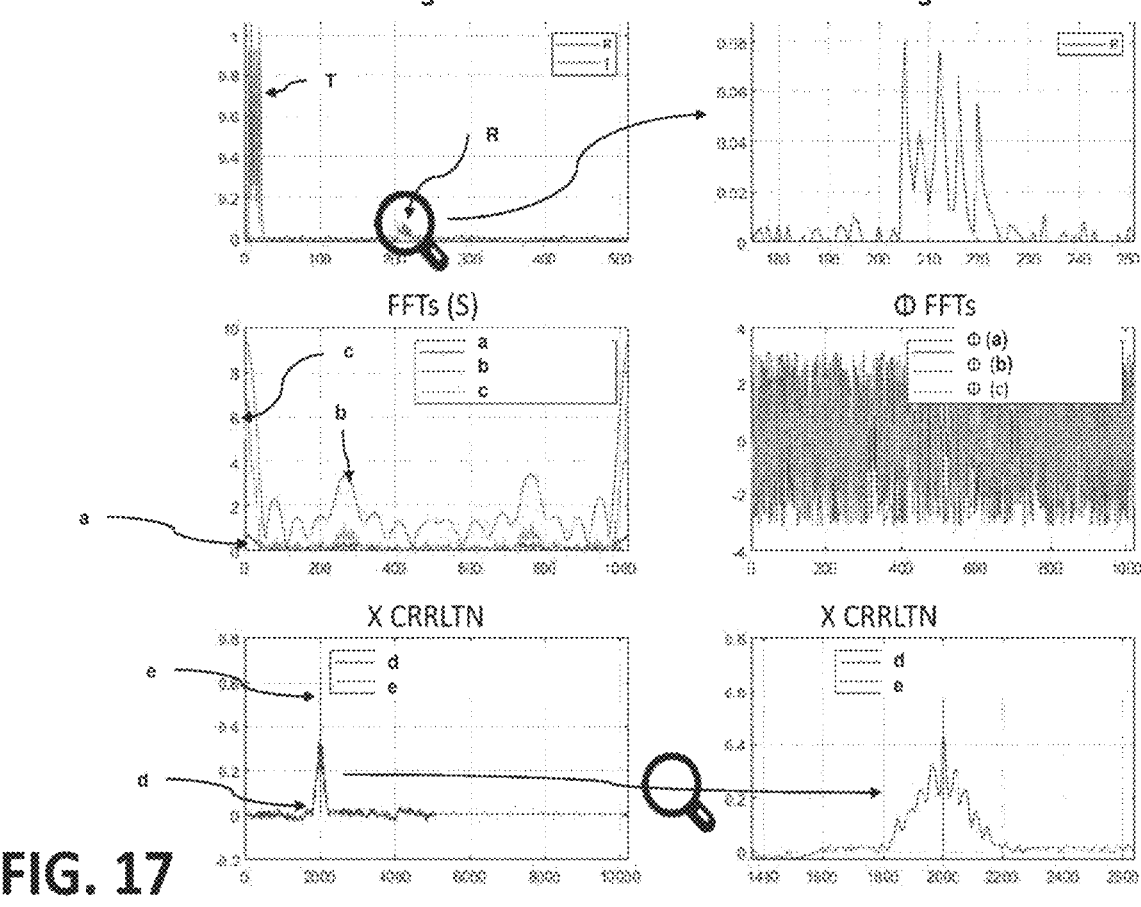
FIG. 17 represents graphs of the simulation of different characteristics of the signal of a pulse-train.

FIG. 17 represents same graphs as FIG. 16, for the simulation of the signals S of the pulse-train.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

The invention claimed is:

1. A multispectral laser detection and ranging device, the device comprising, an optical input for receiving a broadband laser beam pulse having a spectral range, an optical transmitter configured for outputting the broadband laser beam pulse along a direction, the optical input and the optical transmitter being optically connected, and an optical receiver configured to receive a reflection of the broadband laser beam pulse from said direction, and an optical detector configured to detect a time-of-flight and an optical power of at least part of the reflection of the broadband laser beam pulse, wherein the optical detector is optically connected to the optical receiver, wherein the device further comprises:

-a spectral delay unit configured for delaying the broadband laser beam pulse depending on the wavelength, to give a wavelength comb selected in the spectral range, such that the broadband laser beam pulse is transformed into a pulse-train wherein each pulse in the train is at a different wavelength of the wavelength comb, wherein the spectral delay unit comprises an optical fiber, wherein the spectral delay unit comprises a delay input configured to receive the broadband laser beam pulse, and further comprises a delay output configured to transmit the pulse-train, wherein the delay input and the delay output are both a same end of said optical fiber of the spectral delay unit, wherein the device further comprises an optical circulator, wherein said optical circulator comprises a first port, a second port and a third port, and is configured such that light inputted in the first port is outputted from the second port, and light inputted in the second port is outputted from the third port, wherein said same end of the optical fiber is optically connected to the second port of the optical circulator, wherein the first port is fiber-coupled with the optical input, and the third port is fiber-coupled with a scanning module, wherein the scanning module comprises the optical transmitter, wherein the scanning module further comprises the optical receiver, and wherein the optical circulator further comprises a fourth port, configured such that light inputted in the third port is outputted from the fourth port, wherein the fourth port is fiber-coupled with the optical detector.

2. The device according to claim 1, wherein the optical detector is a broadband unique detector.

3. The device according to claim 1, wherein a pulse within the pulse train has a filtered bandwidth which is the bandwidth of the spectral range of the broadband laser beam pulse divided by 4 or 5.

4. The device according to claim 1, wherein the optical detector is an avalanche photodiode electrically connected to a digitizer having a sample rate of 3 GS/s, and to Field Programmable Gate Arrays.

5. The device according to claim 1, wherein the optical fiber is grated with a fiber Bragg grating.

6. The device according to claim 5, wherein the optical fiber Bragg grating is a superstructured Fiber Bragg Grating comprising a plurality of successive fiber Bragg gratings, wherein the gratings are configured to reflect the wavelength comb part of the broadband laser beam pulse, wherein the length between two adjacent fiber Bragg gratings is selected as a function of a time interval between two adjacent pulses in the train pulses.

7. The device according to claim 1, further comprising a broadband laser source connected to the optical input and configured to send the broadband laser beam pulses to the optical input.

8. The device according to claim 7, wherein the laser source is a supercontinuum laser source.

9. The device according to claim 8, wherein the broadband laser beam pulse has a spectral range comprised between 1000 nm and 1700 nm.

10. The device according to claim 8, wherein each of the broadband laser beam pulse has a pulse duration comprised between 0.5 ns and 5 ns.

11. The device according to claim 10, wherein the pulse duration is about 1 ns.

12. The device according to claim 8, wherein each of the broadband laser beam pulse exhibits a bandwidth comprised between 200 nm and 300 nm.

13. The device according to claim 8, wherein each of the laser beam pulse exhibits a bandwidth of 300 nm and the broadband laser beam pulse has a spectral range comprised between 1400-1700 nm, which is an optimum configuration for eye-safety and low-cost detection.

14. A vehicle comprising a device according to claim 1.

15. A multispectral laser detection and ranging device, the device comprising, an optical input for receiving a broadband laser beam pulse having a spectral range, an optical transmitter configured for outputting the broadband laser beam pulse along a direction, the optical input and the optical transmitter being optically connected, and an optical receiver configured to receive a reflection of the broadband laser beam pulse from said direction, and an optical detector configured to detect a time-of-flight and an optical power of at least part of the reflection of the broadband laser beam pulse, wherein the optical detector is optically connected to the optical receiver, wherein the device further comprises:

a spectral delay unit configured for delaying the broadband laser beam pulse depending on the wavelength, to give a wavelength comb selected in the spectral range, such that the broadband laser beam pulse is transformed into a pulse-train wherein each pulse in the train is at a different wavelength of the wavelength comb, wherein the spectral delay unit comprises an optical fiber, wherein the spectral delay unit comprises a delay input configured to receive the broadband laser beam pulse, and further comprises a delay output configured to transmit the pulse-train, wherein the delay input and the delay output are both a same end of said optical fiber of the spectral delay unit, wherein the device further comprises an optical circulator, wherein said optical circulator comprises a first port, a second port, a third port and a fourth port, and is configured such that light inputted in the first port is outputted from the second port, and light inputted in the second port is outputted from the third port, and configured such that light inputted in the third port is outputted from the fourth port, wherein said same end of the optical fiber is optically connected to the third port of the optical circulator, wherein the first port is fiber-coupled with the optical input, and the third port is fiber-coupled with a scanning module, wherein the scanning module comprises the optical transmitter, wherein the scanning module further comprises the optical receiver, and wherein the fourth port is fiber-coupled with the optical detector.

16. The device according to claim 15, wherein the optical detector is a broadband unique detector.

17. The device according to claim 15, wherein a pulse within the pulse train has a filtered bandwidth which is the bandwidth of the spectral range of the broadband laser beam pulse divided by 4 or 5.

18. The device according to claim 15, further comprising a broadband laser source connected to the optical input and configured to send the broadband laser beam pulses to the optical input.

19. The device according to claim 18, wherein the laser source is a supercontinuum laser source.

20. The device according to claim 15, wherein each of the broadband laser beam pulse exhibits a bandwidth comprised between 200 nm and 300 nm.

* * * * *